Patented Feb. 29, 1944

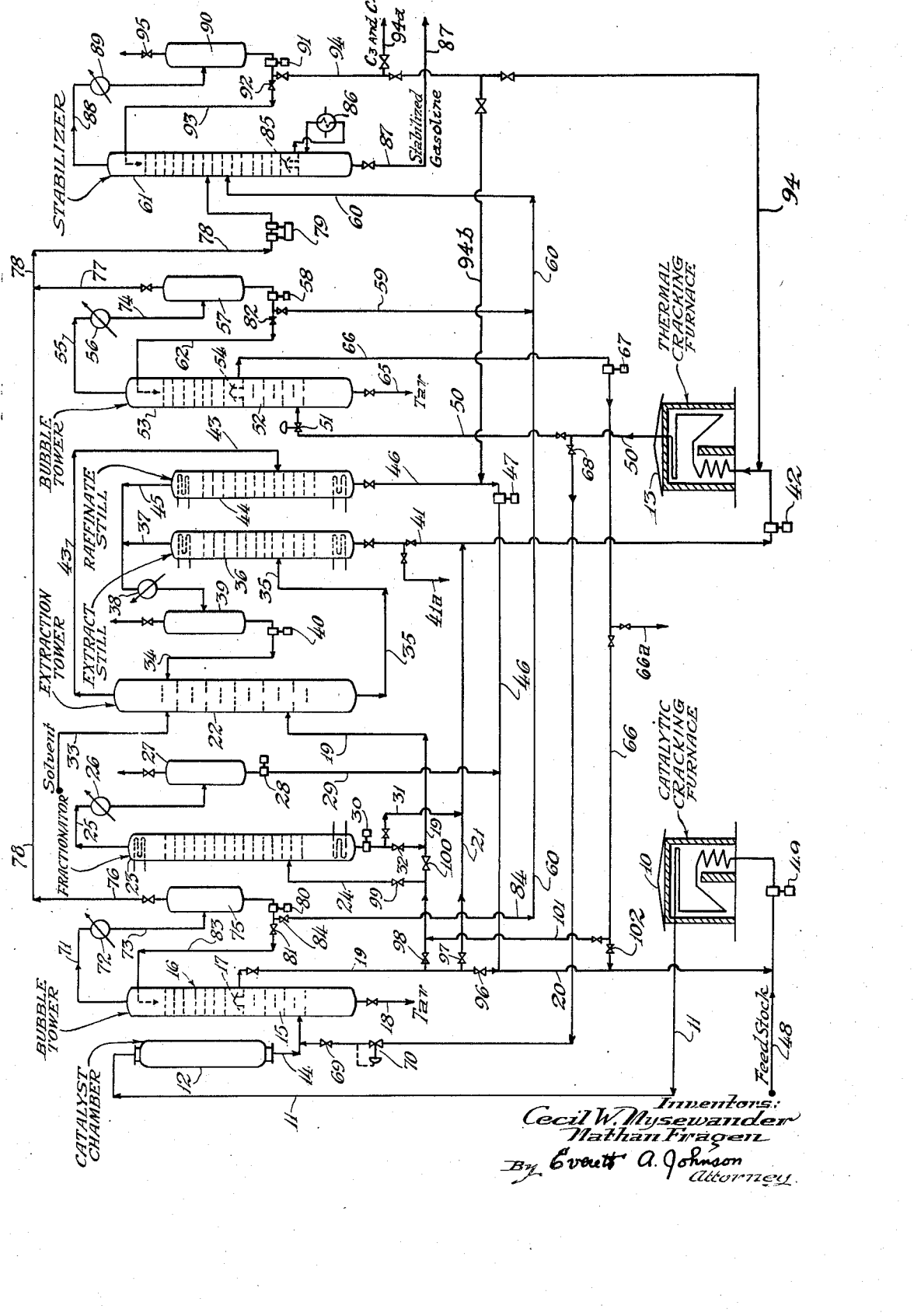

2,342,888

UNITED STATES PATENT OFFICE 2,342,888

CONVERSION OF HYDROCARBONS

Cecil W. Nysewander, Highland, and Nathan Fragen, Hammond, Ind., assignors to Standard Oil Company, Chicago, Ill., a corporation of Indiana Application December 31, 1940, Serial No. 372,536

3 Claims. (Cl. 196—52)

This invention relates to the manufacture of gasoline and more particularly to the manufacture of gasoline by a combination of processes.

It is an object of this invention to provide a new and improved method of gasoline manufacture. More specifically it is an object of this invention to produce larger yields of improved gasoline and to minimize operating difficulties. Other objects, uses and advantages of our invention will become apparent as the description proceeds.

These and other objects are attained by a combination cracking process involving thermal and catalytic cracking wherein part of the catalytic cracking recycle stock is eliminated to thermal cracking and the remainder is extracted with a solvent.

Further in accordance with our invention, all or a selected portion of cycle stock from a catalytic cracking process is subjected to solvent extraction, thereby separating it into a raffinate fraction consisting essentially of paraffinic and naphthenic hydrocarbons and an extract fraction comprised of aromatics. The raffinate is recycled to the catalytic cracking operation with fresh feed. The extract is sent to thermal cracking directly or it is rerun and the heavy ends withdrawn before recycling to catalytic cracking. In a further embodiment of our invention the recycle stock is fractionated, the heavy material extracted and the raffinate recycled to the catalytic cracking step.

The invention will be described in detail in connection with the specific embodiments thereof shown in the accompanying drawing which forms a portion of this specification and is to be read in connection therewith. The drawing is in simplified flow diagram form.

Referring more specifically to the drawing, the heated material from furnace 10 passes through transfer line 11 into catalyst chamber 12. It will be understood that in actual practice a number of catalyst chambers usually will be employed either in series or in parallel and that means will be provided for the regeneration of the catalyst. Since, however, the present invention does not reside in such details, the catalyst portion of the operation has been shown in the simplest diagrammatic fashion.

Fixed bed, moving bed, or powdered catalyst operations are contemplated. Various catalysts can be used. It is preferred, however, to employ solid refractory cracking catalysts of the metal oxide type such as silica-alumina, silica-magnesia, alumina-zirconia, silica-zirconia-alumina, silica gel promoted with one or more metal oxides absorbed thereon, for example magnesia and/or alumina, acid treated bentonite and other acid treated clays such as Super Filtrol, and other natural and synthetic refractory catalysts of the solid metal oxide type.

It is appropriate at this point to mention the conditions which may suitably prevail in the two cracking zones to which reference is made. The conditions prevailing in catalyst chamber 12 will, of course, depend upon the stock which is being cracked, the results which are desired, and particularly upon the catalyst employed. Moreover, the optimum temperature will depend to some extent on the pressure employed and both are inter-related with contact time.

Fixed bed granular, moving bed granular, or flowing powdered catalyst techniques can be used. In fixed or moving bed operations a space velocity within the range of 0.2 and 6 volumes of oil per volume of gross catalyst space per hour, for example, a space velocity of 1.0, and a catalyst residence or holding time of between about 10 minutes and 4 hours, for example, one hour, can be used. In powdered catalyst technique a space velocity of between about 1 and 20, for example 5 volumes of oil per volume of catalyst per hour, and a holding time of between about 0.5 and 60 minutes, for example about 5 minutes, can be used. In powdered catalyst technique the volume of catalyst is the volume occupied by the catalyst present in the reactor at any one instant measured at rest or in the compacted condition. In each of the above techniques, a pressure of between about 0 and 50 pounds per square inch gauge and a reaction temperature within the range of about 800° F. to 1000° F. are preferred. However, temperatures within the range of about 750° F. and about 1050° F. can be used. It is contemplated that low space velocities will be coupled with high holding times or that high space velocities will be used with low holding times, or intermediate velocities and intermediate holding times can be combined to give a desired degree of cracking. Steam is beneficial in the catalytic cracking when pumped with the fresh feed in amounts of between 1% and 30% by weight of the fresh feed depending somewhat upon the boiling range of the feed stock. The use of steam has been found to improve the gasoline yield and improve the quality of the cycle stock at a given gasoline yield as well as to lower the coke and dry gas yield.

In the case of thermal cracking furnace 13, the outlet temperature can suitably range between about 875° F. and about 1100° F., but preferably between 900° F. and 1020° F., for example 940° F., and the outlet pressure can suitably range between about 100 pounds per square inch and about 1500 pounds per square inch, for example 700 pounds per square inch.

Reverting to the catalyst chamber 12, the cracked material from this chamber passes through line 14 into evaporator 15 which is shown integral with bubble tower 16 and separated therefrom by trap-out plate 17. From the base of evaporator 15 a tar fraction can be removed through valved line 18.

All material lighter than tar passes overhead from evaporator 15 through trap-out plate 17 into bubble tower 16. A gas oil cycle stock is removed by means of valved line 19 and passes through valved line 20 and thence part can be eliminated by valved line 21 to thermal cracking furnace 13. Likewise, all the cycle stock can be sent to extraction tower 22 wherein it is extracted and the raffinate recycled with fresh feed.

It is highly desirable, however, that the gas oil from all sources can be fractionated in tower 23 and the overhead material recycled to catalytic cracking with fresh feed. It is preferable that the heavy material from tower 23 be extracted and the raffinate recycled. Hence at least a portion of the gas oil cycle stock is conducted by line 24 to fractionator 23 where a 5% to 30%, for example a 10%, bottoms is eliminated. The light gas oil vapors are conducted by line 25 to condenser 26 and thence to receiver 27. This light gas oil is then conducted by pump 28 and lines 29, 46 and 20 to the catalytic cracking furnace 10.

Rerunning of an extract of the gas oil recycle stock to eliminate a portion of the heavy ends improves the recycle stock and reduces the tendency to form carbonaceous deposits without a sacrifice in the gasoline yield. For example a fraction which had been rerun to eliminate 10% of the heavy ends was subjected to cracking at 925° F., a space velocity of 0.97, and at substantially atmospheric pressure, with Super Filtrol as the catalyst. The whole fraction was subjected to cracking operation under the same conditions. The gasoline yield was the same but the rerun fraction gave a carbon yield of 1.9 weight percent at the charge and the whole fraction deposited 7.5 weight percent.

The heavy gas oil cycle stock comprising 5 to 30% of the cycle gas oil can be conducted by pump 30 and valved line 31 to thermal cracking furnace 13. Likewise the heavy gas oil cycle stock can be conducted by valved line 32 to extraction tower 22 or a separate extraction tower (not shown) and processed as described in connection with the gas oil cycle stock, the extract phase going, for example, to the thermal cracking furnace 13 and the raffinate to the catalytic cracking furnace 10.

Cycle stock, cycle stock fractions, or a portion of either, can be charged by line 19 to extraction tower 22 where it is extracted by a suitable solvent introduced by line 33 and/or line 34. The stock to the tower 22 can also be a fraction heavier than gas oil obtained by fractionation of the cycle stock; the lighter fraction comprising 95 to 70% of the gas oil cycle stock can be recycled to catalytic cracking with fresh feed as indicated above.

Various solvents can be employed in the extraction, for example, suitable selective solvents are nitroparaffins such as nitromethane and nitroethane, nitroparaffin-$SO_2$, benzol-acetone, furfural, methyl ethyl ketone, liquefied $SO_2$, $SO_2$-benzol and other oxygen or halogen-containing organic solvents boiling below about 350° F. Additional solvents of higher boiling point such as aniline, chloraniline, phenol, chlorphenol, cresol and nitro-benzene, become available for economic use in our process when other methods of solvent recovery are used as, for example, water and/or alcohol washes followed by distillation. A solvent-to-oil ratio of between about 1:1 and 4:1, for example 3:1, is preferred.

The operation of tower 22 can be improved by introducing the cycle feed stock through line 19 at a slightly elevated temperature, for example, 100 to 150° F. with nitrobenzene and simultaneously applying cooling means (not shown) to either or both ends of the tower 22, thus causing a separation of oil from solvent in the end zones which results in a refluxing and fractionating action. The solution of solvent and extracted material is withdrawn from the bottom of tower 22 by line 35 leading to extract still 36 where the solvent is distilled off and recycled by line 37 to condenser 38 and solvent receiver 39 whence it flows by pump 40 and line 34 back to the extraction tower 22. The extract oil substantially free of solvent is withdrawn by line 41 and conducted to thermal cracking furnace 13 by pump 42 as hereinafter described.

The amount of extract separated depends upon two major factors, the character of the gas oil charged to the extraction tower and the design and operating conditions of the extraction tower including the temperature, the solvent chosen, solvent-oil ratio, etc. The character of the gas oil in turn depends upon the nature of original charge to the catalytic cracking and the operating conditions thereof. In general, the amount of extract is sufficiently great to include substantially all of the polynuclear aromatic hydrocarbons present in the charge to the solvent extraction operation. The control of the degree of extraction is familiar to those skilled in the art. Ordinarily between about 5% and 50% of the feed stream to the extraction tower 22 is recovered as a polycyclic extract.

The raffinate or gas oil fraction undissolved by the solvent is conducted by line 43 to raffinate still 44 wherein solvent is distilled off by line 45 and the raffinate substantially free of solvent is conducted by valved line 46, pump 47 and line 20 to catalytic cracking furnace 10 with fresh feed entering by line 48 and pump 49. Because of the effect of the solvent extraction on the gas oil recycled, we are enabled to operate the catalytic process for a longer period of time without fouling of the catalyst. The raffinate oil will crack at a higher rate so that a higher percentage of cracking per pass is obtained than in the case of recycling without partial elimination of cycle stock or by recycling a selected fraction or raffinate of the cycle gas oil.

The extract fraction of the cycle stock is withdrawn from still 36 by line 41 and forced by pump 42 to thermal cracking furnace 13 where it is rapidly heated to conversion temperatures of the order of 850° to 975° F. Part of the total cycle stock from trap-out plate 17 and bottoms from the gas oil fractionator 23 can also be charged to the thermal cracking furnace 13. Valved draw-off 41a is provided on line 41 whereby a portion of the extract can be diverted from the stream to the thermal cracking if desired.

From thermal cracking furnace 13 the cracked materials pass through transfer line 50 and pressure reduction valve 51 into evaporator 52 which is shown integral with bubble tower 53 and separated therefrom by trap-out plate 54. Gasoline and lighter hydrocarbons are removed by vapor line 55 leading to condenser 56 and receiver 57. The condensate is then withdrawn from receiver 57 by pump 58 and valved line 59 and line 60 leading to stabilizer 61 where the desired gasoline is separated as hereinafter described. Tar is removed from the base of evaporator 52 by means of valve line 65, while cycle stock of the gas-oil type is removed from the base of bubble tower 53, i. e., from trap-out plate 54, through valved line 66 from which it is introduced by pump 67 and valved lines 101 and 19 into extraction tower 22 or cycled to the catalytic cracking furnace 10 through valved line 102 with gas oil from trap-out plate 17 as previously indicated. Valved draw-off 66a is provided on line 66 whereby all or a portion of the recycle gas oil may be diverted, for example, to solvent-extraction tower 22 or thermal cracking furnace 13.

Instead of having separate evaporators and bubble towers for the products from the catalytic cracking and thermal cracking, products from furnace 13 can be passed from line 50 through shut-off valves 68 and 69 and pressure reduction valve 70 into line 14 and thence into evaporator 15. In this case evaporator 52 and bubble tower 53 with accompanying equipment are not required. The mixed cycle stocks will leave by line 19 and enter the extraction tower 22 together, just as can be done when separate towers are provided.

From bubble towers 16 and 53 materials lighter than gas oil, which consist generally of gasoline range hydrocarbons and lighter materials, pass overhead through lines 71 and 55 and thence through condensers 72 and 56 respectively, and lines 73 and 74, to reflux drums 75 and 57. The gases from these various reflux drums are taken overhead through valved lines 76 and 77 and line 78 to compressor 79 from which they pass to stabilizer 61.

Condensate from reflux drums 75 and 57 is removed through pumps 80 and 58, respectively, and a portion is returned to the appropriate bubble tower by means of valves 81 and 82 and lines 83 and 62, respectively. The remainder of this condensate passes through valved lines 84 and 59, respectively, and thence through line 60 into stabilizer 61.

Stabilizer 61 is operated at an elevated pressure in the conventional manner. It is equipped with a reboiler which includes conventional trap-out plate 85 and heater 86. The stabilizer is also provided with reflux and the pressure, reboiling and reflux are controlled to take stabilized gasoline off the base of the tower 61 through valved line 87 for storage, further treatment or use.

Gases eliminated in producing stabilized gasoline pass overhead from stabilizer 61 through line 88 and condenser 89 and thence to reflux drum 90. Condenser 89 is operated to condense such portion of the $C_4$ hydrocarbons as cannot be utilized in the finished gasoline, together with a considerable amount of $C_3$ hydrocarbons. This condensate is removed from the base of reflux drum 90 by means of pump 91 and a portion of it is returned to stabilizer 61 through valve 92 and line 93 as reflux. The remainder is removed from the system through valved line 94a for storage and use. Light gases are removed from the system through valved line 95.

These liquid $C_3$ and $C_4$ hydrocarbons can be recycled to either of the cracking operations. For example, these hydrocarbons can be subjected to gas reversion by introducing them into line 41 by line 94 and treated in thermal cracking furnace 13. We can also employ gas reversion in catalytic cracking furnace 10 by introducing the $C_3$—$C_4$ hydrocarbons by line 94b into line 46 for example. Thus these hydrocarbons are treated to produce higher yields of improved gasoline and to reduce the tendency to coke formation, particularly in the treatment of the polycyclics.

Gas oil cycle stock which is removed from towers 16 and 53 by means of trap-out plates 17 and 54 may suitably have an initial boiling point of between about 350° F. and about 525° F. and a final boiling point of between about 575° and 800° F. A part of this gas oil cycle stock can be passed through the coils of the thermal cracking furnace 13. The feed to the catalytic cracking furnace 10 preferably includes raffinate from a solvent extraction of the gas oil cycle stock in addition to the fresh feed. By controlling valves 96, 97, 98, 99 and 100, and valved line 102, all or a part of the gas oil cycle stock from both bubble towers is extracted in tower 22 and the total raffinate is sent to the catalytic cracking furnace 10. Likewise part of the gas oil cycle stock from bubble tower 16 can be cycled to the thermal cracking operation with the extract. Alternatively, all or a portion of the gas oil cycle stock can be fractionated in tower 23 with the light gas oil cycle stock going to catalytic cracking alone or with part or all of the raffinate produced by extracting the heavy gas oil cycle stock. The gas oil cycle stock from bubble tower 53 likewise can be routed as above.

It will thus be seen that our new combination cracking operation involves catalytic cracking of fresh feed along with a raffinate of all or a portion of a cycle stock from the catalytic cracking operation itself, the extract and remainder of cycle stock going to thermal cracking; catalytic cracking of an overhead gas oil fraction along with fresh feed, the gas oil bottoms going to thermal cracking; and catalytic cracking of the raffinate of the gas oil bottoms along with the gas oil overhead and fresh feed, the extract going to thermal cracking.

The flow diagram of our combination cracking process as well as the description of it is highly simplified and various details such as heat exchangers, pressure and flow-control devices, additional valves and pumps, etc., are omitted since these detailed features would add little to the knowledge of those skilled in the art and would merely encumber this specification unnecessarily.

While our invention has been described with reference to certain embodiments thereof, it is to be understood that they can be modified in various ways without departing from the invention and that we do not mean to be limited thereby but only by the appended claims.

We claim:
1. A combination cracking process comprising subjecting fresh feed to a catalytic cracking operation, separating the products of said catalytic cracking operation into fractions including a gasoline fraction and a recycle gas oil, fractionating a portion of said recycle gas oil to produce a light gas oil cycle stock and a heavy gas oil cycle stock, subjecting said heavy gas oil cycle stock to a solvent extraction operation, recovering a raffinate and an extract from said solvent extraction oper- ation, recycling said light gas oil cycle stock and said raffinate to the said catalytic cracking operation, subjecting said extract and a portion of said recycle gas oil to a thermal cracking operation, separating the products of said thermal cracking operation into fractions including a clean cycle stock fraction, and recycling said clean cycle stock to said catalytic cracking operation.

2. A combination cracking process comprising subjecting a fresh feed to catalytic cracking, separating the products of said catalytic cracking operation into fractions including a gasoline fraction and a recycle gas oil, subjecting a heavy fraction of said recycle gas oil to a solvent extraction operation, recovering a raffinate and an extract from said solvent extraction operation, passing said raffinate and a light fraction of said recycle gas oil to the said catalytic cracking operation, subjecting said extract to a thermal cracking operation, separating the products of said thermal cracking operation into fractions including a liquid $C_3$ and $C_4$ hydrocarbon fraction, and subjecting this last-mentioned fraction to gas reversion in the said thermal cracking operation whereby higher yields of improved gasoline are obtained and the coke forming tendency of the thermal cracking charging stock is reduced.

3. A combination cracking process comprising subjecting a fresh feed to catalytic cracking, separating the products of said catalytic cracking operation into fractions including a recycle gas oil subjecting a heavy fraction of said recycle gas oil to a solvent extraction operation, recovering a raffinate and an extract from said solvent extraction operation, passing said raffinate and a light fraction of said recycle gas oil to the said catalytic cracking operation, subjecting said extract to a thermal cracking operation, separating the products of said thermal cracking operation into fractions including a liquid $C_3$ and $C_4$ hydrocarbon fraction, and subjecting at least a portion of this last-mentioned fraction to gas reversion in one of said cracking operations.

CECIL W. NYSEWANDER.
NATHAN FRAGEN.